UNITED STATES PATENT OFFICE.

LUDWIG HEYER, OF BERLIN, PRUSSIA, GERMANY.

TREATING WASTE VULCANIZED CAOUTCHOUC.

SPECIFICATION forming part of Letters Patent No. 226,070, dated March 30, 1880.

Application filed January 10, 1880. Patented in Germany July 4, 1879, in Belgium July 19, 1879, and in Great Britain July 26, 1879.

*To all whom it may concern:*

Be it known that I, LUDWIG HEYER, of Berlin, in the Empire of Germany, have invented Improvements in the Mode of Treating Used or Waste Vulcanized or other Caoutchouc, and in the Application of the Resulting Product to Industrial Purposes, of which the following is a specification.

My invention relates to the regenerating of used or waste vulcanized or other caoutchouc or india-rubber so as to render the same fit for use in various ways, and in the application of the so regenerated material or substance to industrial purposes.

In carrying out my said invention I use a vessel, boiler, or other receptacle of suitable form, which I divide into three or more compartments by means of wire sieves or their equivalents.

The lower compartment contains boiling or warm water or other suitable fluid, the vapor from which acts so on the vulcanized caoutchouc or other similar material in the central compartment or compartments that the coke or other material or gas or other firing contained in the upper compartment or compartments cannot ignite the caoutchouc or other material contained in the compartment or compartments between the said firing and the compartment or compartments containing the warm or boiling water or other fluid, but only melts the same, whereas the sulphur and other extraneous substances or matter or matters are removed or destroyed by the coke or other fire.

The melted caoutchouc or other material sinks into the lower compartment or compartments, and the heavy spar or other additions to the vulcanized or other caoutchouc remains on the sieve or sieves or the equivalents of the same in the central compartment or compartments. The caoutchouc or india-rubber so won is boiled or subjected to the action of water and steam combined, or water or steam alone, or other suitable fluid, until the said caoutchouc or other material is sufficiently fluid or so melted that the same can be let off or poured through a seive or other equivalent, so that any extraneous matter or matters, substance or substances which may have remained in the caoutchouc are removed.

By using this method pure caoutchouc or india-rubber is obtained, which weighs on the average two-thirds of the entire amount of used or waste vulcanized caoutchouc or other material treated.

Waste and used vulcanized and other caoutchouc or other similar material is to be had in large quantities at very low price, as the same could not hitherto be used or applied commercially.

The above-described process of regenerating caoutchouc and similar materials is very simple, and can consequently be carried out with little expense.

The regenerated "Heyer" caoutchouc or other similar substance can easily be detected from natural or vulcanized caoutchouc, as the same is of a dark color and possesses somewhat less elasticity and consistency than natural or original caoutchouc or other similar material.

This said invention relates, further, to the method of applying the said regenerated caoutchouc or other similar material or matter.

The above-mentioned regenerated caoutchouc or other similar material is mixed with siccative and oil of turpentine or other similar ingredients until the mass or substance is of the desired thickness or consistency; or the regenerated caoutchouc can be warmed until the same is of the required consistency, and used without any addition whatsoever.

This mixture of caoutchouc or other similar material (or caoutchouc alone) and turpentine-oil, siccative, or other suitable ingredient or ingredients, can be used or applied for waterproofing all classes of material or substances, such as canvas, cloth, paper, leather, &c., for waterproofing carriage-covers, tarpaulins, tents, water-proof coats, leggins, packing paper or canvas, water-tight papers for walls, for painting articles exposed to climatic influences, the action of rain, salt-water, &c., for painting ships, houses, iron, wood, and other materials, as a varnish in general, as an isolating material, and in various other branches of industry.

Any desired color can be given to the aforementioned regenerated caoutchouc by adding the said color to the ingredients, as aforementioned.

Articles coated or saturated with the regenerated caoutchouc or other similar material possess greater flexibility than such articles or materials when coated with original or vulcanized caoutchouc or other similar matter or substance.

The said regenerated caoutchouc is not liable to crack or crumble, but binds so with the material to which it is applied that it can only be removed by melting off or scraping with a sharp scraping-tool.

Having now described my said invention, and the manner in which the same is to be carried out, I desire it to be understood that I do not confine myself to any special form of boiler, vessel, or other receptacle, to the form or construction of the perforated, grated, or sieve-like partitions between the said compartments, or to the kind of firing to be used, as these can be varied according to circumstances without departing from the principle of my invention.

I am, however, aware that it is old to treat waste rubber by boiling in hot water alone, steam, or by the application of superheated steam, and that the process of treating such material first with hydrochloric acid, then with naphtha, turpentine, or similar material in connection with steam, gas, or hot air is old, and I do not claim the same; but

What I claim as my invention, and desire to have secured by Letters Patent, is—

1. The process of regenerating waste caoutchouc, consisting in subjecting it to the direct action of heat in connection with the vapor of heated water, substantially as described.

2. The process of regenerating waste caoutchouc by subjecting it, after the removal of the sulphur by the direct action of heat, to the action of boiling water or steam, and then straining it, substantially as and for the purpose described.

LUDWIG HEYER.

Witnesses:
EDWIN A. BRYDGES,
G. EHLEN.